US007849812B2

(12) United States Patent
Ahmed et al.

(10) Patent No.: US 7,849,812 B2
(45) Date of Patent: Dec. 14, 2010

(54) METHOD AND APPARATUS FOR AUTOMATED COATING OF ELECTRICAL INSULATORS WITH A SILICONE COMPOSITION

(75) Inventors: Farooq Ahmed, Guelph (CA); Faisal Huda, Toronto (CA); Seraj ul Huda, Toronto (CA); John Barr, Eden Mills (CA); Steve Moss, Guelph (CA)

(73) Assignee: CSL Silicones Inc., Guelph, Ontario (CA)

( * ) Notice: Subject to any disclaimer, the term of this patent is extended or adjusted under 35 U.S.C. 154(b) by 207 days.

(21) Appl. No.: 11/362,905

(22) Filed: Feb. 28, 2006

(65) Prior Publication Data

US 2007/0199506 A1  Aug. 30, 2007

(51) Int. Cl.
*B05C 5/02* (2006.01)
(52) U.S. Cl. ............... 118/66; 118/641; 118/58; 118/72; 118/73; 118/300
(58) Field of Classification Search .......... 118/58, 118/66, 72, 73, 641, 300; 427/372.2, 425, 427/427.2, 427.4
See application file for complete search history.

(56) References Cited

U.S. PATENT DOCUMENTS

| 4,476,155 | A | 10/1984 | Niemi |
| 5,041,164 | A | 8/1991 | Hingorani |
| 5,326,804 | A | 7/1994 | Mistry et al. |
| 5,395,449 | A * | 3/1995 | Quadir et al. ............... 118/303 |
| 6,437,039 | B1 | 8/2002 | Ahmed et al. |
| 6,833,407 | B1 | 12/2004 | Ahmed et al. |
| 2003/0113461 | A1 | 6/2003 | Ahmed et al. |
| 2003/0198734 | A1* | 10/2003 | Mann ..................... 427/96 |
| 2004/0006169 | A1 | 1/2004 | Ahmed et al. |
| 2004/0081756 | A1* | 4/2004 | Coots et al. ............... 427/240 |

FOREIGN PATENT DOCUMENTS

| CA | 1063888 | 10/1979 |
| CA | 2124357 | 6/1993 |
| CN | 1169015 C | 9/2004 |
| DE | 4100265 | 7/1992 |

* cited by examiner

*Primary Examiner*—Laura Edwards
(74) *Attorney, Agent, or Firm*—Bereskin & Parr LLP

(57) ABSTRACT

The present invention provides an automated continuous coating apparatus for coating industrial components such as porcelain, glass, and polymeric insulators. The apparatus consists of a several stage continuous inline operation. The stages are a cleaning operation, followed by drying and heating, coating, and curing.

12 Claims, 1 Drawing Sheet

METHOD AND APPARATUS FOR AUTOMATED COATING OF ELECTRICAL INSULATORS WITH A SILICONE COMPOSITION

FIELD OF THE INVENTION

The present invention is directed to an automated continuous coating apparatus and method and in particular, to a coating apparatus for coating components such as, high voltage line insulators with silicone rubber coatings, more particularly with one component room temperature vulcanizable (RTV) silicone rubber.

BACKGROUND OF THE INVENTION

Components utilized in industrial structures are frequently exposed to a corrosion environment and must be protected. For example, insulators utilized in electrical utilities such as suspension insulators in high voltage power transmission lines are designed to keep to a minimum, current discharge under normal conditions. However, when the insulator surface becomes contaminated, leakage current can develop along the surface of the insulator. The amount of this leakage current depends upon the voltage stress and conductivity of the film or contaminant on the surface of the insulator. The leakage currents can incur or cause arcing on the surface of the insulator which can have serious effects upon the insulator surface such as the formation of free carbon and non-volatile semiconductor materials. It may eventually result in a conducting path forming across the surface of the insulator and effectively shorting out the insulator.

The outer surface of the electrical insulator is the most important part of the insulator as this is the part that is subjected to the effects of electrical voltage stress, leakage currents and weathering. When the surface of the high voltage insulator is exposed to moisture such as rain or fog in combination with contaminated atmospheres as are found in industrial locations, the surface may be subject to extensive corrosion unless protected in some way from exposure to the corrosive atmosphere. Other potentially corrosive environments include along sea coasts where salt spray is found and in areas where agricultural chemicals are widely distributed.

More and more electrical utilities are switching toward the use of a one component room temperature vulcanizable (RTV) silicone rubber coating for these high voltage line sulators. By coating the surface of the insulator with the electrically non-conductive material, the coating provides for improved insulation that is arc resistant, hydrophobic and resistant to the stresses imposed upon such electrical insulators. This results in increased tin of the insulator between scheduled maintenance as well as increased overall life of the insulator. Examples of such coatings are shown for example in the applicant's prior U.S. patents and applications, specifically U.S. Pat. No. 6,833,407 issued Dec. 21, 2004; U.S. Pat. No. 6,437,039 issued Aug. 20, 2002; U.S. Pat. No. 5,326,804 issued Jul. 5, 1994; 2004/0006169 published Jan. 8, 2004 and 2003/0113461 published Jun. 19, 2003.

In addition to electric insulators, other components for industrial structures would also benefit from the automated application and method such as that of the present invention.

These insulators are manually coated on the ground and strung on the overhead transmission lines. This is not only labour and cost intensive, but also time consuming, especially for industrialized countries. Thus, there remains a need for a cost effective rapid method of coating a large number of insulators.

SUMMARY OF THE INVENTION

The present invention provides an automated continuous coating apparatus for coating industrial components such as porcelain, glass, and polymeric insulators with a silicone elastomeric coating. The apparatus consists of a several stage continuous inline operation. The stages are a cleaning operation, followed by drying and heating, coating, and curing.

An aspect of the invention provides an apparatus for automatically coating an industrial component with a silicone elastomeric coating in a continuous inline operation, the apparatus comprising:

a conveying means for holding the industrial component and moving the component through the automated apparatus;

a cleaning station for cleaning the surfaces of the component;

a drying and heating station to dry the surface of the cleaned component and heat the surface of the component to aid in adherence of a silicone elastomeric coating;

a coating station to apply a coating of a curable silicone elastomeric composition on the exposed surfaces of the component; and a curing station to accelerate the curing of the silicone elastomeric composition.

BRIEF DESCRIPTION OF THE DRAWINGS

Preferred embodiments of the present invention are illustrated in the attached drawings in which.

DETAILED DESCRIPTION OF THE PREFERRED EMBODIMENTS

Figure 1:
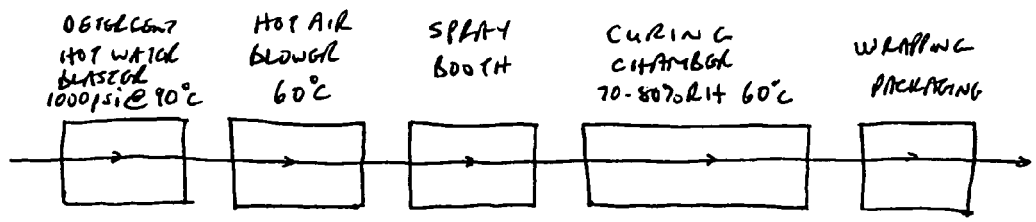
FIG. 1 is a schematic view of a first embodiment of a continuous coating apparatus of the present invention.

The present invention is directed to an automated continuous coating apparatus for coating industrial components such as porcelain, glass or polymeric insulators with a silicone coating composition. The apparatus consists of a several stage continuous inline operation as illustrated in FIG. 1. The first stage of the apparatus is cleaning and set up for ensuring that the surface of the insulator is free from any materials such as oils, grease, dust or other soils which may interfere with the adherence of the silicone coating to the insulator surface. The cleaning of the insulator may be accomplished by any of the methods commonly utilized, such as steam cleaning, hot water spray, hot water blasts, solvent wiping or dry ice blasting. Preferably the cleaning operation utilizes either steam cleaning or hot water blasting. In order to improve the cleaning efficiencies, detergent and other washing aids may be added to the cleaning solutions to help in the removal of organic materials or other soils from the surface of the insulator. Once the insulator has been washed with the cleaning solution, it is preferably rinsed with a clean steam or hot water blast.

Once the insulator has been cleaned, it then passes to a drying and heating apparatus where any moisture remaining on the insulator is evaporated in this apparatus. Preferably the apparatus moves heated air across the surface of the insulator to improve the drying and heating. Most preferably this is accomplished by the use of a hot air blower blowing air at approximately 40° C. to 150° C., preferably 40° C. to 80° C., more preferably about 60° C. through the apparatus. During the drying stage, the insulator is also heated to a desired temperature level. This heating of the insulator aids in the application and curing of the silicone composition to the surface of the insulator.

Once the insulator has been dried and heated, it passes through a coating apparatus in which the surface of the insulator is coated with a uniform coating of a silicone composition. The silicone composition is preferably as taught in our previous patents and applications, specifically U.S. Pat. No. 6,833,407 issued Dec. 21, 2004; U.S. Pat. No. 6,437,039 issued Aug. 20, 2002; U.S. Pat. No. 5,326,804 issued Jul. 5, 1994; particularly the one part RTV compositions shown in U.S. Pat. No. 5,326,804 issued Jul. 5, 1994. The disclosure of these prior patents are incorporated herein by reference. This coating may be accomplished by many different processes. In one process, the coating is applied by a dip coating wherein the insulator is dipped in a bath of silicone material to allow the material to cover and adhere to the surface of the insulator. Preferably in order to maintain the uniformity of the coating on the insulator, the insulator may be rotated at a speed sufficient to provide for the desired coating level on the insulator surface. The viscosity of the silicone composition is also controlled to allow the composition to coat the entire surface of the insulator. When utilizing dip coating, the dipping area is maintained under a nitrogen atmosphere to avoid skinning of the surface of the silicone composition.

Figure 3:
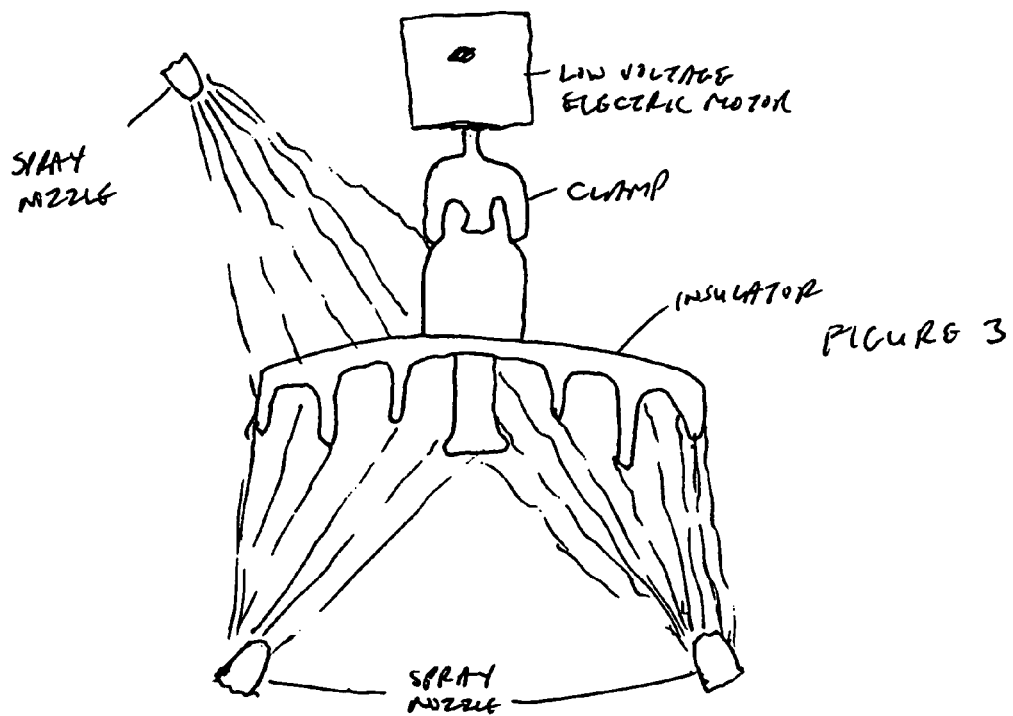
FIG. 3 is a perspective view of a preferred embodiment of a spray nozzle arrangement for coating of the present invention.

The silicone composition may also be applied to the surface of the insulator by a spray means. This may be accomplished utilizing one or more spray nozzles directing the composition at the surface of the insulator to coat the surface with the uniform coating of the composition. Preferably, in order to uniformly coat the entire surface of the insulator, the insulator may be rotated such that the spray of the composition from the nozzle coats the entire surface of the insulator. More preferably, in order to coat both the upper and lower surfaces of the insulator, at least two nozzles are provided in the spray apparatus, one above the path of the insulator through the apparatus, and one below the path of the insulator through the apparatus. In some circumstances with some configurations of insulators, it may also be advantageous to provide more than one nozzle at one or both of the upper and lower surfaces of the insulator as illustrated in FIG. 3. Alternatively, a robotic apparatus utilizing a single spray nozzle programmed to spray the exposed surfaces of the insulator may be utilized.

Once the silicone composition has been applied to the surface of the insulator, the silicone coating is then allowed to cure. Preferably, in order to increase the curing of the silicone composition, the coated insulator is placed in a curing chamber, such as an oven for one part RTV silicone coatings, to decrease the amount of time required for the coating to cure. Preferably for RTV systems the curing chamber or oven is maintained at approximately 60° C. with 70-80% relative humidity. For other cure systems such as a radiation cure system, for example UV cure, the oven is provided with a suitable radiation source, for example UV lighting to initiate and accelerate the curing. In these applications, the oven may also be supplied with a nitrogen atmosphere. For coatings utilizing a volatile solvent, a flash oven with an explosion proof chamber is provided prior to the curing chamber to remove the volatile components. By providing the curing chamber or part of the system, the standard curing time is greatly reduced. For example, the standard curing time of several hours for a one-part RTV silicone is reduced to less than one hour. This allows the insulator to have an improved quality and consistency of the coating thickness combined with an increased hourly production rate of coated insulators to cut down the production costs significantly.

Once the coated insulator has properly cured, the insulators are then inspected and packaged for shipping to the final customers.

Figure 2:
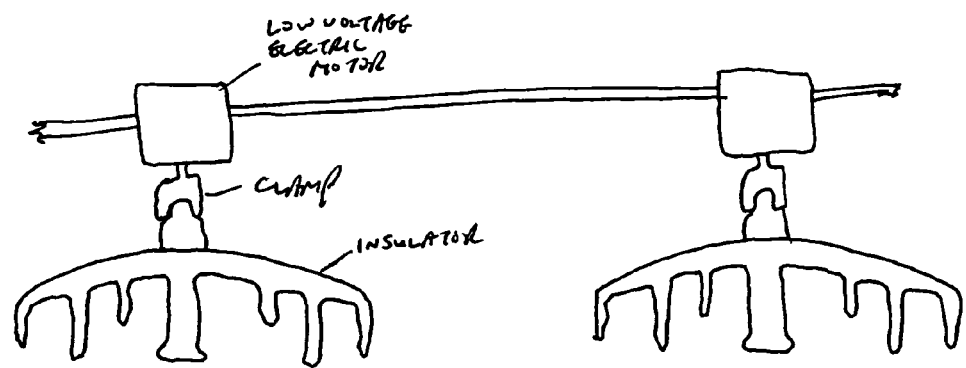
FIG. 2 is a perspective view of a preferred embodiment of the conveying apparatus of the present invention.

The automated coating line of the present invention utilizes a conveyor system to move the insulators through each of the stages of the operation. Preferably, the conveying apparatus utilized also allows for rotation of the insulator through the stages to allow for uniform treatment of the surface of the insulator as described above. In one embodiment, this is accomplished by providing a rotating means to rotate the insulators at a slow rate such as an electric motor as illustrated in FIG. 2. The insulator is releasably clamped to the rotation means to which holds onto the insulator during its motion through these stages of the coating apparatus. The electric motors and clamps are disposed along a conveyor means to move through the stages of the apparatus.

Other means of providing the conveying and rotation of the insulators through the apparatus may also be provided such as, for example, a dual-speed belt or chain drive such that the clamp for the insulator is connected to a gear driven simultaneously by the two belts or chains as the belts or chains are travelling at different rates of speed in the same direction. The gear and attached insulator rotates as it moves along the line.

Alternatively, if each of the cleaning and coating stations are provided with robotic spray apparatus, it may not be necessary to rotate the insulators throughout the apparatus.

The following example is used to illustrate a preferred embodiment of the present invention, but the invention is not limited to this embodiment.

In a preferred embodiment of the automated coating apparatus of the present invention, the conveying apparatus moves the insulators along at a speed of approximately 5 meters per minute while rotating the insulators at a rotation speed of 12 revolutions per minute. The insulator is washed in the washing station for approximately 1 minute followed by 1 minute drying time. The insulator is then coated in the spray booth for about 5 seconds before travelling to the curing chamber in which it is heated at 60° C. for 20 minutes to cure the coating on the insulator. The insulator is then wrapped in the packaging. The apparatus of the present invention allows for a high throughput coating of electrical insulators with a throughput of approximately 500 insulators coated for every hour of operation. This results in significant labour and cost savings for coating of the high voltage insulators.

Although various preferred embodiments of the present invention have been described herein in detail, it will be appreciated variations may be made thereto without departing from the spirit of the invention.

The invention claimed is:

1. An apparatus for automatically coating an electrical insulator with a silicone elastomeric coating in a continuous inline operation the apparatus comprising:

a cleaning station for cleaning surfaces of the electrical insulator;

a drying and heating station to dry the surfaces of the electrical insulator and heat the surfaces of the electrical insulator to aid in adherence of a silicone elastomeric coating;

a supply of a curable silicone elastomeric composition;

a coating station to apply a coating of the curable silicone elastomeric composition on the exposed surfaces of the electrical insulator, wherein the coating station comprises a robotic apparatus with a spray nozzle programmed to spray the curable silicone composition onto exposed surfaces of the electrical insulator;

a curing station to accelerate the curing of the curable silicone elastomeric composition, wherein the curing station comprises a chamber having an atmosphere of 70-80% relative humidity at about 60° C. to accelerate curing of the curable silicone elastomeric composition on the surfaces of the electrical insulator; and a conveying means for holding the electrical insulator and moving the electrical insulator through the automated apparatus, comprising a conveyor for conveying the electrical insulator through the stations, an electrical motor coupled to the conveyer, and a coupler for releasably coupling the electrical insulator to the electrical motor, wherein the electrical motor is configured to rotate the electrical insulator about a vertical axis as the electrical insulator passes through the stations.

2. The apparatus according to claim 1 wherein the curable silicone elastomeric composition is a one-part room temperature vulcanizable composition.

3. The apparatus according to claim 2 wherein the cleaning station comprises one or more nozzles dispensing steam, hot water or solvent onto the surfaces of the electrical insulator.

4. The apparatus according to claim 3 wherein the cleaning station comprises a plurality of nozzles dispensing blasts of hot water onto the surfaces of the electrical insulator to clean the surfaces of the electrical insulator.

5. The apparatus according to claim 4 wherein the drying and heating station comprises a hot air blower blowing hot air over the surfaces of the electrical insulator to dry and heat the surfaces of the electrical insulator.

6. The apparatus according to claim 1, wherein the coating station is maintained with at least a partially nitrogen enriched atmosphere so as to prevent skinning.

7. An apparatus for automatically coating an electrical insulator with a silicone elastomeric coating in a continuous inline operation the apparatus comprising:

a cleaning station for cleaning the surfaces of the electrical insulator;

a drying and heating station to dry the surfaces of the cleaned electrical insulator and heat the surfaces of the electrical insulator to aid in adherence of a silicone elastomeric coating;

a supply of a curable silicone elastomeric composition;

a coating station to apply a coating of the curable silicone elastomeric composition on the exposed surfaces of the electrical insulator, wherein the coating station comprises a robotic apparatus with a spray nozzle programmed to spray the curable silicone composition onto exposed surfaces of the electrical insulator;

a curing station to accelerate the curing of the curable silicone elastomeric composition, wherein the curing station comprises a chamber having an atmosphere having a relative humidity within a preselected range at a preselected temperature, the humidity range and the temperature being selected to accelerate curing of the curable silicone elastomeric composition on the surfaces of the electrical insulator; and a conveying means for holding the electrical insulator and moving the electrical insulator through the automated apparatus, comprising a conveyor for conveying the electrical insulator through the stations, an electrical motor coupled to the conveyer, and a coupler for releasably coupling the electrical insulator to the electrical motor, wherein the electrical motor is configured to rotate the electrical insulator about a vertical axis as the electrical insulator passes through the stations.

8. The apparatus according to claim 7 wherein the curable silicone elastomeric composition is a one-part room temperature vulcanizable composition.

9. The apparatus according to claim 8 wherein the cleaning station comprises one or more nozzles dispensing steam, hot water or solvent onto the surfaces of the electrical insulator.

10. The apparatus according to claim 9 wherein the cleaning station comprises a plurality of nozzles dispensing blasts of hot water onto the surfaces of the electrical insulator to clean the surfaces of the electrical insulator.

11. The apparatus according to claim 10 wherein the drying and heating station comprises a hot air blower blowing hot air over the surfaces of the electrical insulator to dry and heat the surfaces of the electrical insulator.

12. The apparatus according to claim 7 wherein the preselected range is about 70-80% relative humidity and the preselected temperature is about 60° C.

\* \* \* \* \*